US007126113B2

(12) United States Patent
Yokosuka et al.

(10) Patent No.: US 7,126,113 B2
(45) Date of Patent: Oct. 24, 2006

(54) MASS SPECTROMETRY SYSTEM

(75) Inventors: Toshiyuki Yokosuka, Hitachi (JP); Atsumu Hirabayashi, Kodaira (JP); Yasushi Terui, Tsuchiura (JP); Kinya Kobayashi, Hitachi (JP); Kiyomi Yoshinari, Hitachi (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 11/041,864

(22) Filed: Jan. 25, 2005

(65) Prior Publication Data

US 2005/0184232 A1 Aug. 25, 2005

(30) Foreign Application Priority Data

Feb. 24, 2004 (JP) ............................ 2004-047172

(51) Int. Cl.
*B01D 59/44* (2006.01)
*H01J 49/00* (2006.01)

(52) U.S. Cl. ...................... 250/281; 250/281; 250/282; 250/288

(58) Field of Classification Search ................ 250/288, 250/281, 282
See application file for complete search history.

(56) References Cited

U.S. PATENT DOCUMENTS 5,212,096 A * 5/1993 Kolhouse et al. ............. 436/93
6,379,971 B1 * 4/2002 Schneider et al. ............ 436/89
6,787,761 B1 * 9/2004 Hastings ..................... 250/282
6,864,089 B1 * 3/2005 Figeys et al. .................. 436/6
2004/0169138 A1 9/2004 Ootake et al.

FOREIGN PATENT DOCUMENTS

JP 2000-266737 A 9/2000
JP 2004-71420 A 3/2004

OTHER PUBLICATIONS

Wysocki, Vicki, H., et al. "Mobile and localized protons: a framework for understanding peptide dissociation." Journal of Mass Spectrometry, 35, 2000, pp. 1399-1406.
Meek, James, L. "Prediction of peptide retention times in high-pressure liquid chromatography on the basis of amino acid composition," Proc. Natl. Acad. Sci. USA 77, 1980, pp. 1632-1636.

* cited by examiner

*Primary Examiner*—Jack Berman
*Assistant Examiner*—Jennifer Yantorno
(74) *Attorney, Agent, or Firm*—McDermott Will & Emery LLP

(57) ABSTRACT

According to the existing mass spectrometric system, whether or not the informations are sufficient for analyzing substances (particularly proteins, sugars, etc.) cannot be judged in the process of measurement. Further, it is difficult to find out isomers having just the same mass number or compounds very close in mass only from the MS data. According to this invention, whether or not the retention time in the LC (or GC) of peptide formed at the time of enzymatic decomposition of protein coincides with the predicted retention time assumed from the amino acid sequence predicted from $MS^2$ mass spectrometry data is judged within the actual time period of measurement, and thereby the quality of $MS^2$ mass spectrometry data (quantity of information) is judged.

21 Claims, 13 Drawing Sheets

A CASE THAT MOBILE PROTON EXISTS
(NO. OF BASIC AMINO ACIDS) < (PEPTIDE VALENCY NO.), VALENCY NO. : 1

A CASE THAT BASIC AMINO ACID EXISTS AND MOBILE PROTON DOES NOT EXISTS (NO. OF BASIC AMINO ACIDS) ≧ (PEPTIDE VALENCY NO.), VALENCY NO. : 1

A CASE THAT BASIC AMINO ACID AND ACIDIC AMINO ACIDS EXISTS AND MOBILE PROTON DOES NOT EXISTS (NO. OF BASIC AMINO ACIDS) ≧ (PEPTIDE VALENCY NO.), VALENCY NO. : 1

OBJECT OF ANALYSIS : A PEPTIDE CONTAINING ONE ARGINIC ACID (BASIC AMINO ACID) AND ONE ASPARTIC ACID (ACIDIC AMINO ACID)

OBJECT OF ANALYSIS :
A PEPTIDE CONTAINING ONE ARGININE (BASIC AMINO ACID)
AND ONE ASPARTIC ACID (ACIDIC AMINO ACID)

MASS SPECTROMETRY SYSTEM

INCORPORATION BY REFERENCE

The present application claims priority from Japanese application JP2004-047172 filed on Feb. 24, 2004, the content of which is hereby incorporated by reference into this application.

BACKGROUND OF THE INVENTION

This invention relates to a mass spectrometry system and to a method of mass spectrometric analysis.

Mass spectrometric analysis includes a method of ionizing a sample and directly analyzing the ionized sample (MS analysis) and a method of selecting a specified sample ion (parent ion) according to mass thereof, dissociating the sample ion to form a dissociated ion, and subjecting the dissociated ion to mass spectrometric analysis which is called tandem mass analysis. The tandem method has a function of carrying out dissociation and mass analysis in multi-stage, namely, for example, first selecting out an ion having a specified mass-to-charge ratio (precursor ion) from the dissociated ions, further dissociating the precursor ion, and subjecting the dissociated ion to mass analysis (n-the stage measurement, hereinafter referred to as $MS^n$).

For quantitatively analyzing samples small in quantity and high in the impurity content, a combined system of chromatography and mass analyzer is used. According to this system, a sample to be quantitatively analyzed is separated by time based on the difference in the degree of adsorption to a chromatographic column, or the like, and separated by mass by means of a mass analyzer. In cases of sugar chain isomers or compounds consisting of combination of two different amino acids equal in mass to each other, such materials cannot be separated by mass. However, most of such materials can be separated by time in chromatography according to the difference in chemical properties or physical properties.

Identification of peptides is carried out by a method of using data base search or by a method of reading out the amino acid sequence from the peak distances in the mass spectrometric data. Both these methods are carried out as an after-treatment. The spectral information which has been obtained is insufficient in amount, therefore, it is necessary to collect the data again. Accordingly, this method has not been useful for analyzing quite minute samples, such as disease-formed proteins.

Japanese Patent Kokai 2000-266737 (patent document 1) discloses a method of analyzing the object by comparing the retention times in the sample-separating part and mass spectrum data of the object with those of known substance. However, these treatments are all after treatments. Further, although the comparison with the data of known substance makes it possible to judge that the analyzed sample is an unknown substance, identification of the analyzed sample is difficult to carry out based on such a method.

J. L. Meek, Proc. Natl. Acad. Sci. USA 77, 1632 (1980) (non patent document 1) indicates that, in the case of peptides, retention time can be predicted from the construction of peptide-forming amino acids and the terminal groups. The predicted retention time of a peptide can be calculated based on the sum of the retention time-coefficients of the peptide-forming amino acids and the terminal groups and the elution time of the un-retained compound.

It is an object of this invention to solve a problem that, in the existing mass spectrometry system, whether or not the obtained information is sufficient for analyzing a substance (particularly proteins, sugar chains, etc.) cannot be judged within the actual time period of measurement.

According to the conventional method of mass spectrometry, the species of ion to be subjected to analysis $MS^n$ has been determined from the dissociation spectrum of (n−1)th stage ($MS^{n-1}$), based on the knowledge of the measuring staff. Accordingly, the measurement of $MS^n$ has taken a long period of time, so that the spectrometric analysis has usually been carried out only to the stage of n=2. At the stage of n=2, the spectrometric informations necessary for identification have often been unobtainable, and it is difficult in such cases to identify an unknown protein which requires more informations for identification.

If the number of amino acid residues constituting a peptide chain is taken as K and the kind of amino acids is taken as 20, the number of amino acid sequences which can be thought out becomes $20^K$. If chemical modification of the amino acid side chains is taken into consideration in addition to the above, the number becomes further greater. Such cases include a number of cases where two amino acids are combined together to form an amino acid of which mass coincides with the combined amino acids. Thus, in some states of dissociation of amino acids, it is difficult to distinguish the cases in the term of mass.

According to the data base searching which is a known technique, it is usual to compare the spectrometric data obtained from the 2-th stage of mass analysis with the data base and the degree of coincidence is investigated. Since the data stored in the data base are the second stage mass analysis data for a known substance, identification of unknown substance is impossible. Further, since the quantity of the data accumulated in the data base is huge, there is a high possibility of picking up a number of false positive nominees. According to the de novo peptide sequence method which is a well known method, mass of amino acid is calculated from the peak-peak distance in the dissociation spectrum of n-stage ($n \geqq 2$), and based on the calculated mass, the amino acid sequence is predicted. Since in this method amino acid sequence is predicted by the use of m/z only, there is a possibility of referring to an enormous number of nominees. Even if the right sequence is involved in such nominees, this method is not adequate from the viewpoint of accuracy of identification. In both the above-mentioned methods, a number of false positive nominees are enumerated, and the work of drawing out the correct answer therefrom requires very much labor and experience.

J. Mass Spectrum. 35, 1399–1406 (2000) (non patent document 2) indicates that, in a case where mobile proton ($H^+$ freely movable between amino acids) is absent (a case that (the number of basic amino acids contained in a peptide)≧(valency number of peptide)) and the peptide contains acidic amino acids such as aspartic acid, glutamic acid and the like, an intense peak of selective dissociation appears in the C-terminal side of acidic amino acid. In this case, the peaks of breakage between other amino acids are very low in intensity, so that it is difficult to identify the object of measurement in a high accuracy.

It is an object of this invention to provide an apparatus for mass spectrometric analysis with which structure and construction of the object of measurement in a high efficiency and accuracy.

SUMMARY OF THE INVENTION

The most important characteristic feature of this invention consists in evaluating the tandem mass spectrometric analytical data provided from the mass spectrometric analytical part by the use of the retention time τ determined in the sample separation part, in a mass spectrometric system having a sample introducing part, a sample separating part, an ionizing part for ionizing the sample, and a mass spectrometric analytical part.

According to this invention, the data of mass spectrometric analysis are evaluated in real time by the use of retention time τ of the object of measurement in the mass separation part, structure and construction of the object of the measurement can be determined in a high efficiency and high accuracy.

Other objects, features and advantages of the invention will become apparent from the following description of the embodiments of the invention taken in conjunction with the accompanying drawings.

DESCRIPTION OF REFERENCE NUMERALS

1—introduction of sample, 2—separation of sample, 3—storage of data into internal data base (measured retention time τ and mass m), 4—ionization, 5—mass spectrometric analytical measurement ($MS^1$), 6—dissociation reaction of parent ion, 7—mass spectrometric analytical measurement ($MS^2$), 8—mass spectrometric analysis of $MS^2$, 9—prediction of nominee, 10—introduction of predicted retention time τ', 11—comparison of measured retention time τ and predicted retention time τ', 12—selection of precursor ion, 13—$MS^3$, $MS^{2'}$ analyses, 14—internal data base, 15—pretreatment system, 16—ionization part, 17—mass analysis part, 17A—collision cell, 18—ion detecting part, 19—data treatment part, 20—display part, 21—control part, 22—user input part, 23—the whole mass analysis system, 24—getting of $MS^2$ mass spectrum, 25—after treatment, 25-1—data treatment, 25-2—data base searching, 26—storage of data into memory (retention time τ, mass number m), 27—judgement of LC conditions (whether or not the conditions have been changed ), 28—whether the internal data base are to be eliminated or to be stored under another name, 29—mobile proton, 30—amino acid, 31 proton-addition site, 32—basic amino acid, 33—trapped proton, 34—acidic amino acid, 35—$MS^1$ spectrometric data, 36—$MS^2$ mass spectrometric data obtained upon dissociating a monovalent ion, 37—$MS^2$ mass spectrometric data obtained upon dissociating a divalent ion, 38—storage of data into internal data base (retention time τ, mass number m, valency number z), 39—judgement of whether or not a mobile proton does not exist and an acidic amino acid exists in the peptide), 40, $MS^{2'}$ analysis, 41—mass spectrum under a definite ionizing condition, 42—mass spectrum under a changed ionizing condition, 43—alteration of ionizing condition, 44—selection of precursor ion (whether or not an object ion of $MS^{2'}$ having an intensity not smaller than a definite value exists).

DETAILED DESCRIPTION OF THE INVENTION

Hereunder, examples of this invention will be mentioned.

Figure 1:
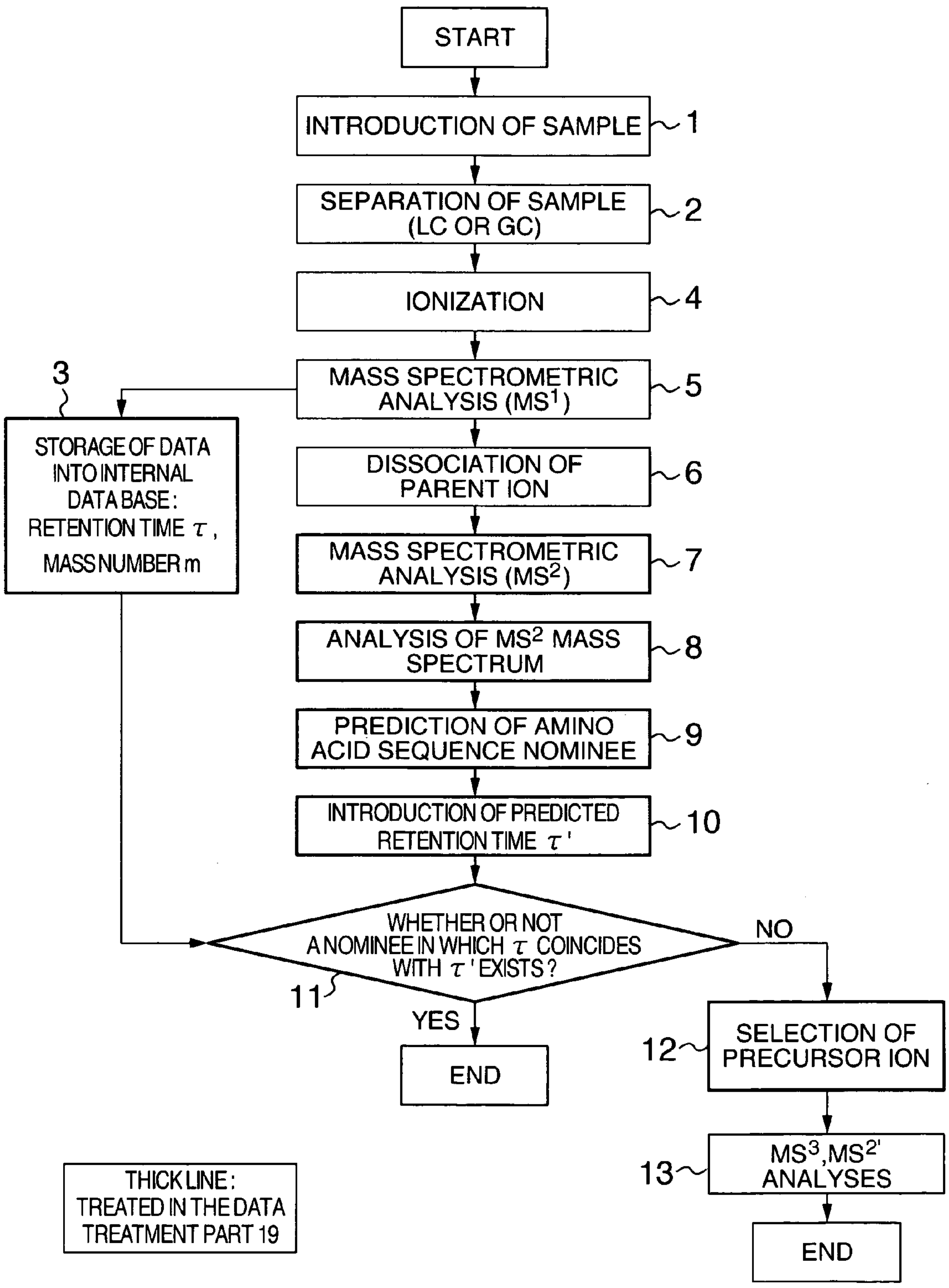
FIG. 1 is an outlined view illustrating the flow of automatic judging treatment in the mass spectrometric flow according to Example 1 of this invention.

FIG. 1 is a flow chart of the automatic judging treatment for the content of analysis in a mass spectrometric system constituting Example 1 of this invention. The data of the mass spectrometric analysis are measured in the mass spectrometric analytical system 23 shown in FIG. 2. In the mass spectrometric analytical system 23, the sample constituting the object of analysis is subjected to a pretreatment such as liquid chromatography or the like in the pretreatment system 15. For example, in the case that the original sample is a protein, the sample is decomposed into a size of polypeptide in the pretreatment system 15 by the action of a digesting enzyme, and then separated by gas chromatography (GC) or liquid chromatography (LC). Thereafter, the decomposed sample is ionized in the ionization part 16, and separated in the mass spectrometric analysis part 17 according to the mass-to-charge ratio (m/z) of the ions, wherein m is mass of the ion and z is the charge of the ion. The separated ions are detected in the ion detecting part 18, subjected to a data-arrangement and treatment in the data-treatment part 19. The mass spectrometric data which are results of the analysis are displayed in the display part 20. A series of treatment, namely the process of mass spectrometric analysis, the preprocessing of sample, the ionization of sample, the transportation and incidence of the sample ion beam into the mass spectrometric analysis part 17, the process of separation according to mass, the detection of ions, and the data treatment, are controlled by the whole process controlling part 21.

The method of mass spectrometric analysis is classified into a method of ionizing a sample and then analyzing the ionized sample directly (MS analysis), and a method of tandem mass analysis which comprises selecting out a specified sample ion (parent ion) according to mass, dissociating the parent ion to form a dissociated ion, and subjecting the dissociated ion to mass spectrometry. The tandem mass spectrometry further has an $MS^n$ function of carrying out dissociation and mass spectrometric analysis in multi-stage ($MS^n$), namely a function of selecting out an ion having a specified mass-to-charge ratio (precursor ion) from the dissociated ions, further dissociating the precursor ion, and subjecting the thus formed dissociated ion to mass spectrometry. That is to say, the mass spectrometric distribution of the substances contained in the original sample is measured as mass spectrometric data ($MS^1$), after which a parent ion having a specified m/z value is selected, the selected parent ion is dissociated, the mass spectrometric data ($MS^2$) of the dissociated ion are measured, and then a precursor ion selected out according to $MS^2$ mass spectrometric data is further dissociated, and then mass spectrometric data ($MS^3$) of the thus formed dissociated ion are measured. By this method, informations concerning the molecular structure of the precursor ion which represents a state before dissociation are obtained by every step of dissociation. This is quite effective for predicting the structure of a precursor ion. More detailed informations of the structure of the precursor make it possible to improve the accuracy of prediction of the structure of parent ion, at the time of predicting the ionic structure of the original parent ion.

Figure 2:
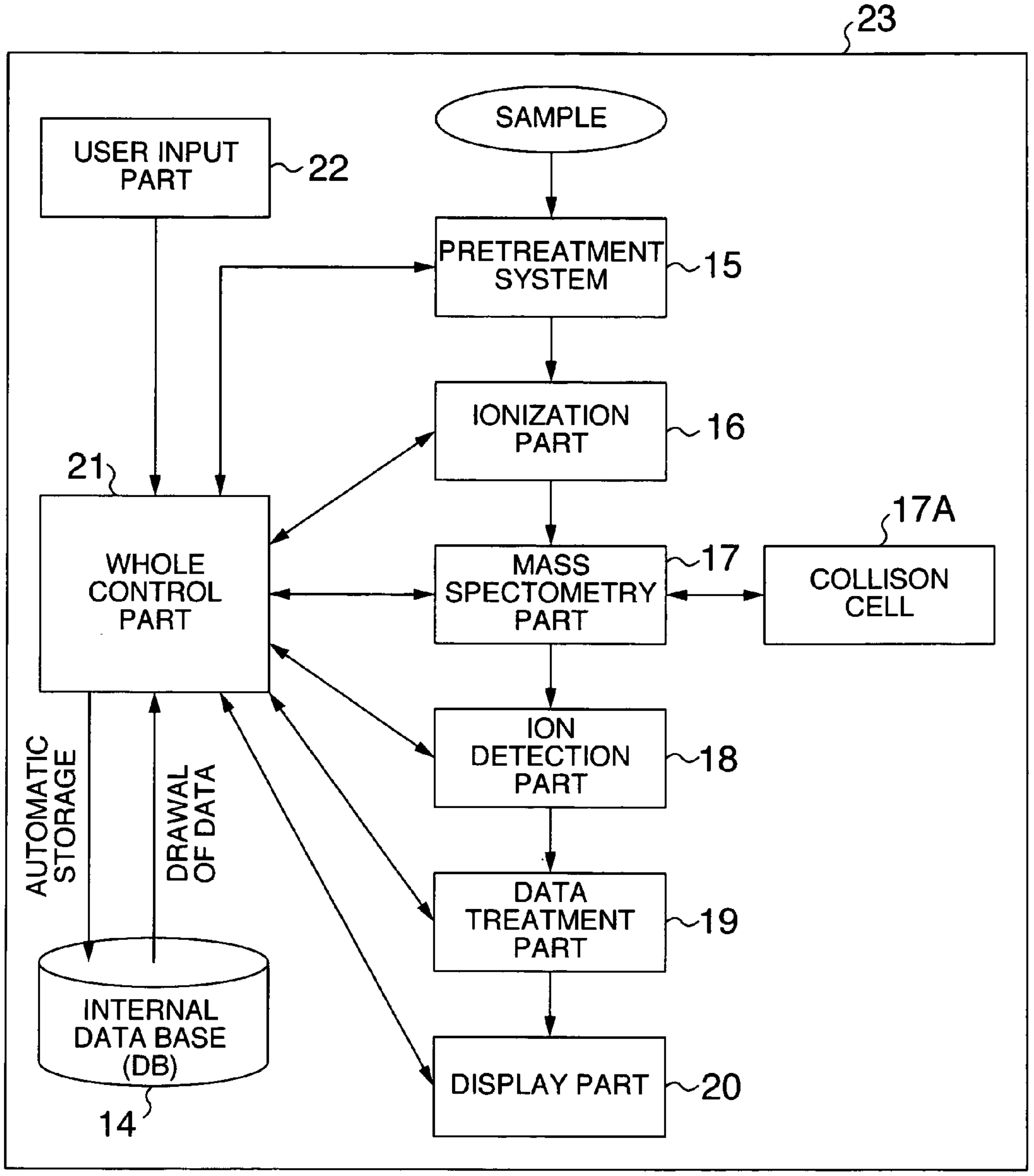
FIG. 2 is an outlined view illustrating the whole mass spectrometric system for measuring the mass spectrometric data according to Example 1 of this invention.

In this example, a case of adopting the collision induced dissociation method, namely a method of dissociating a parent ion by collision against a buffer gas such as helium or the like, as the method of dissociation of the parent ion, will be referred to. Realization of a collision dissociation requires a neutral gas such as helium gas. In some cases, as shown in FIG. 2, a collision cell 17A is provided for realizing a collision dissociation, apart from the mass spectrometric part 17. It is also allowable to fill the mass spectrometric part 17 with a neutral gas to induce a collision dissociation in the mass spectrometric analysis part 17. In the latter case, the collision cell 17A is unnecessary. It is further possible to adopt the method of electron capture dissociation, which is a means for dissociation comprising irradiating low-energy electron as a means for dissociation to make the parent ion capture a large amount of low-energy electron, and thereby to dissociate the target ion.

Figure 3:
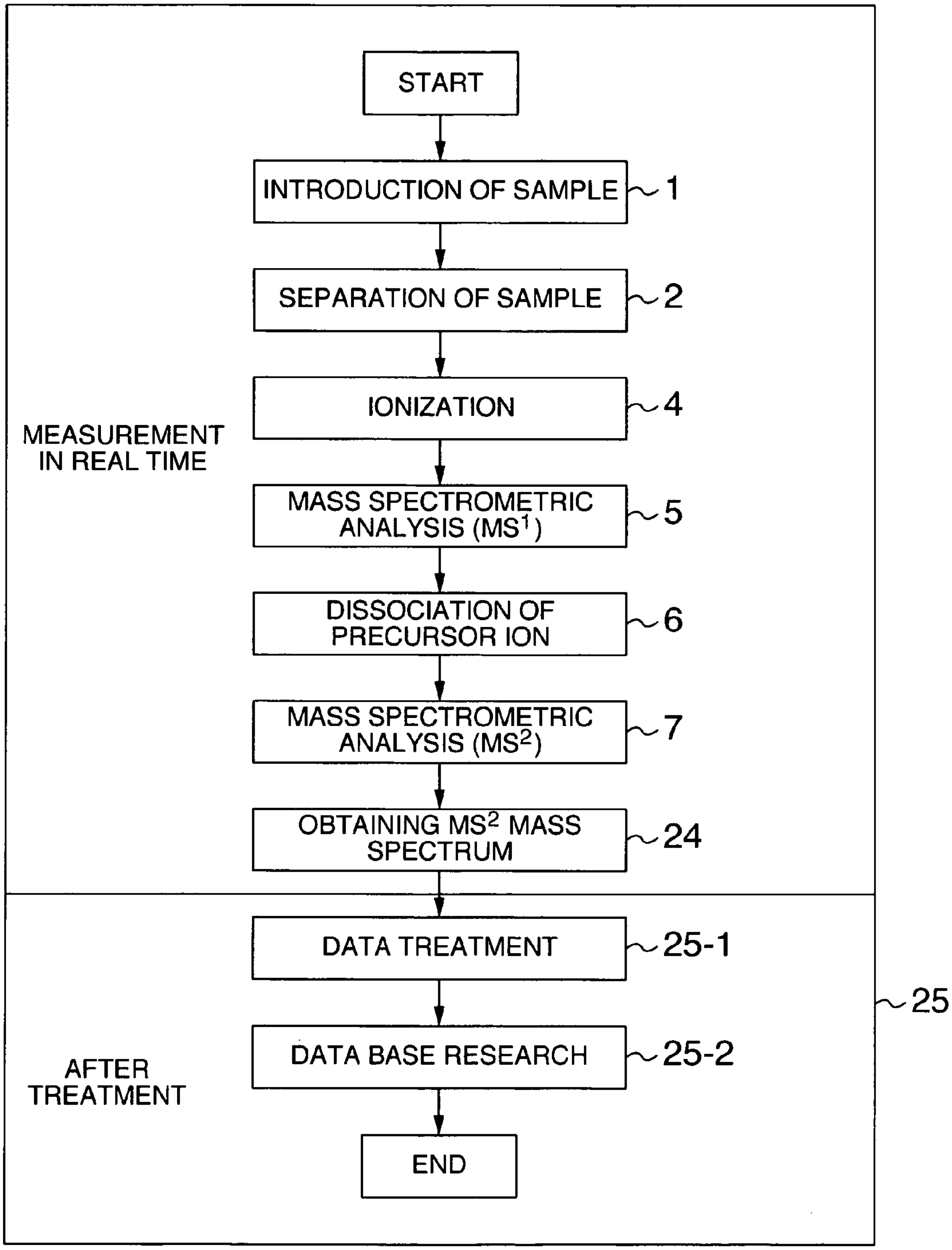
FIG. 3 is an outlined view illustrating the prior mass spectrometric analytical flow.

FIG. 3 illustrates a flow chart for protein identification in the Comparative Example using tandem mass analysis. In FIG. 3, the constructional elements having the same numbers as in FIG. 1 mean the same constructional elements as in FIG. 1. Therefore, only the points different from FIG. 1 will be explained below. A sample which has been introduced is separated by LC or GC, and thereafter ionized. Then, mass spectrometric analysis ($MS^1$) is carried out, and the precursor ion to be subjected to $MS^2$ analysis is selected out from the detected ions. After dissociating the selected precursor ion, mass spectrometric analysis is again carried out ($MS^2$) to obtain the mass spectrum data of $MS^2$ (24). The measured mass spectrometric data thus obtained are subjected to after treatment (25) such as removal of noise peaks and isotope peaks, valency number judgement, etc. (25-1), and then data base search (25-2) is carried out by the use of protein data base constituted from known proteins. In this identification flow, it is impossible to judge the effectiveness of $MS^2$ mass spectrometric data in real time, because the study of the obtained $MS^2$ mass spectrum data is an after treatment. Further, when the amount of the sample is extremely small, it is difficult to carry out the mass spectrometric analysis again. Thus, it is important to obtain as large an amount as possible of informations by one measurement.

Then, a data base search is further carried out on the $MS^2$ mass spectrometric data obtained by dissociation from the $MS^1$ spectrum which is the mass analysis distribution of peptide in the sample by the use of the data base constituted from known proteins. In this identification flow, it is impossible to judge the effectiveness of $MS^2$ mass spectrometric data in real time, because the study of the thus obtained $MS^2$ mass spectrometric data is an after treatment. Further, when the amount of the sample is extremely small, it is difficult to carry out the mass spectrometric analysis again. Accordingly, it is important to obtain as large an amount as possible of informations by one measurement.

According to this invention, therefore, whether or not retention time of the LC of the peptide formed at the time of enzymatically decomposing a protein coincides with the predicted retention time assumed based on the amino acid sequence predicted from the $MS^n$ data is automatically judged within the actual time period of measurement.

As used herein, the term “retention time” means the period of time from the introduction of sample, the trapping of the sample in LC, and the elution of the sample from LC, to the detection by means of detector. The peptide which has been introduced into LC has an interaction with the stationary phase of the column according to the chemical property thereof. The value of the interaction varies with the kind of peptide. For example, a peptide which is strongly adsorbed and has a high interaction takes a longer period of time for elution; while a peptide having a small interaction takes a shorter period of time for elution. As above, in LC, it is possible to separate LC by time according to chemical property of peptide.

For example, when a plurality of amino acid sequences can be predicted from one mass spectrum, it is difficult to judge what the true amino acid sequence is, from the mass spectrum only. However, it becomes possible to make a judgement by utilizing the retention time of separating part such as LC or GC. When a sample passes through LC or GC, the period of time necessary for elution of sample from the column (retention time) differs from a substance to another substance, because the adsorption-desorption equilibrium constant to the column varies depending on chemical property of the substance. Thus, even if mass number m is the same, retention time varies with chemical structure and chemical property, so that a substance can be distinguished from another substance. In this invention, false positive nominees can be rejected by comparing a retention time ($\tau$) measured by means of LC or GC with a predicted retention time ($\tau'$) which has been calculated for a predicted amino acid sequence within the actual time period of measurement. As the predicted retention time $\tau'$, the value stored in the data base is also usable.

The flow of this invention will be explained by referring to FIG. 1 and FIG. 2. Herein, the content shown by the thick line is a treatment carried out in the data treatment part 19. Introduction of sample is carried out at “introduction of sample 1”. Sample separation 2 is carried out in the pretreatment system 15 by the use of LC or GC. As the pretreatment, LC was used herein. The separated sample is thereafter subjected to ionization 4 in the ionization part 16. In the present example, ESI (electron spray ionization) method was used as the method of ionization. Then, the ionized sample is subjected to mass spectrometric analysis 5 ($MS^1$). In the mass spectrometric analysis 5, treatments are carried out in mass spectrometry part 17, ion detection part 18 and data treatment part 19. At this stage, the LC used for sample separation 2, the mass spectrometric part 17, ion detection part 18 and data treatment part 19 are synchronized, and the time at which the mass spectrometric analysis is carried out is taken as retention time τ of the substance. For this purpose, receiving the result in the data treatment part 19, retention time τ of LC at the time of sample separation 2 and mass number m are stored into the internal data base (data storage 3). The data storage into the internal data base is automatically carried out into the internal data base 14 from the data treatment part 19 through the whole control part 21. Thereafter, based on the result of mass analysis 5, a specific ion (parent ion) is selected, the parent ion is dissociated in the collision cell 17A (dissociation reaction 6 of parent ion), and the resulting dissociated fragments are again subjected to mass spectrometric analysis 7 ($MS^2$) in the mass spectrometry part 17. In the mass spectrometric analysis 7, the same treatments as in $MS^1$ are carried out, except for storage of retention time τ and mass number m of LC into the internal data base. Then, the $MS^2$ mass spectrometric data thus obtained are subjected to MS2 mass spectrum data analysis 8 in the data treatment part 19 to predict 9 the nominee of amino acid sequence nominee. Then, from the data treatment part 19, predicted retention time τ' is calculated (10) on the predicted amino acid sequence nominee. In the present example, predicted retention time τ' was calculated from the sum of the retention time coefficients of constitutional amino acids shown in Table 1, the retention time coefficients of peptide terminals (N-terminal and C-terminal) and elution time of solvent (Referential Example: J. L. Meek, Proc. Natl. Acad. Sci. USA 77, 1632 (1980).

TABLE 1

| Kind of amino acid | Retention time coefficient (min) |
|---|---|
| W | 15.1 |
| F | 12.6 |
| L | 9.6 |
| I | 7 |
| Y | 6.7 |
| C | 4.6 |
| V | 4.6 |
| M | 4 |
| P | 3.1 |
| A | 1 |
| E | 1.1 |
| G | 0.2 |
| R | −2 |
| H | −2.2 |
| D | −0.5 |
| T | −0.6 |
| K | −3 |
| Q | −2 |
| S | −2.9 |
| N | −3 |
| C-terminal (—COOH) | 1.6 |
| N-terminal (H2N—) | 0.9 |

The predicted retention time τ' thus estimated is compared (11) with the measured retention time τ. The two retention times are regarded as "coinciding", when the error is within an allowable range. When a coinciding amino acid sequence nominee exists, it can be considered that the informations necessary for analysis are present in the $MS^2$ mass spectrometric data. Thus, the measurement is finished. On the other hand, when no amino acid sequence nominee having a predicted retention time falling into the allowable error range is found, it is considered that the informations necessary for the analysis are not sufficiently contained in the $MS^2$ mass spectrometric data. Thus, selection 12 of a specified dissociated ion (precursor ion) is carried out, and the selected ion is subjected to $MS^3$ analysis or $MS^{2\prime}$ analysis 13. As used herein, the term $MS^{2\prime}$ means that $MS^2$ analysis is again carried out on an ion which is equal in mass number m to the ion selected in the preceding measurement and different in valency number z from it. At this time, an ion of which z is greater than that of the ion selected in the preceding measurement is preferably selected. This is based on a finding that a larger number of dissociated fragments can be obtained when mass spectrometric analysis is carried out on an ion having a greater valency number (Referential Literature: V. H. Wysocki, G. Tsaprailis, L. L. Smith and L. A. Breci, J. Mass Spectrom. 35, 1399 (2000)). It is allowable that the user inputs whether he uses $MS^3$ analysis or $MS^{2\prime}$ analysis, in the user input part 22. The result which has been judged in the data treatment part 19 is utilized as the next analytical information through the whole control part 21.

Figure 4:
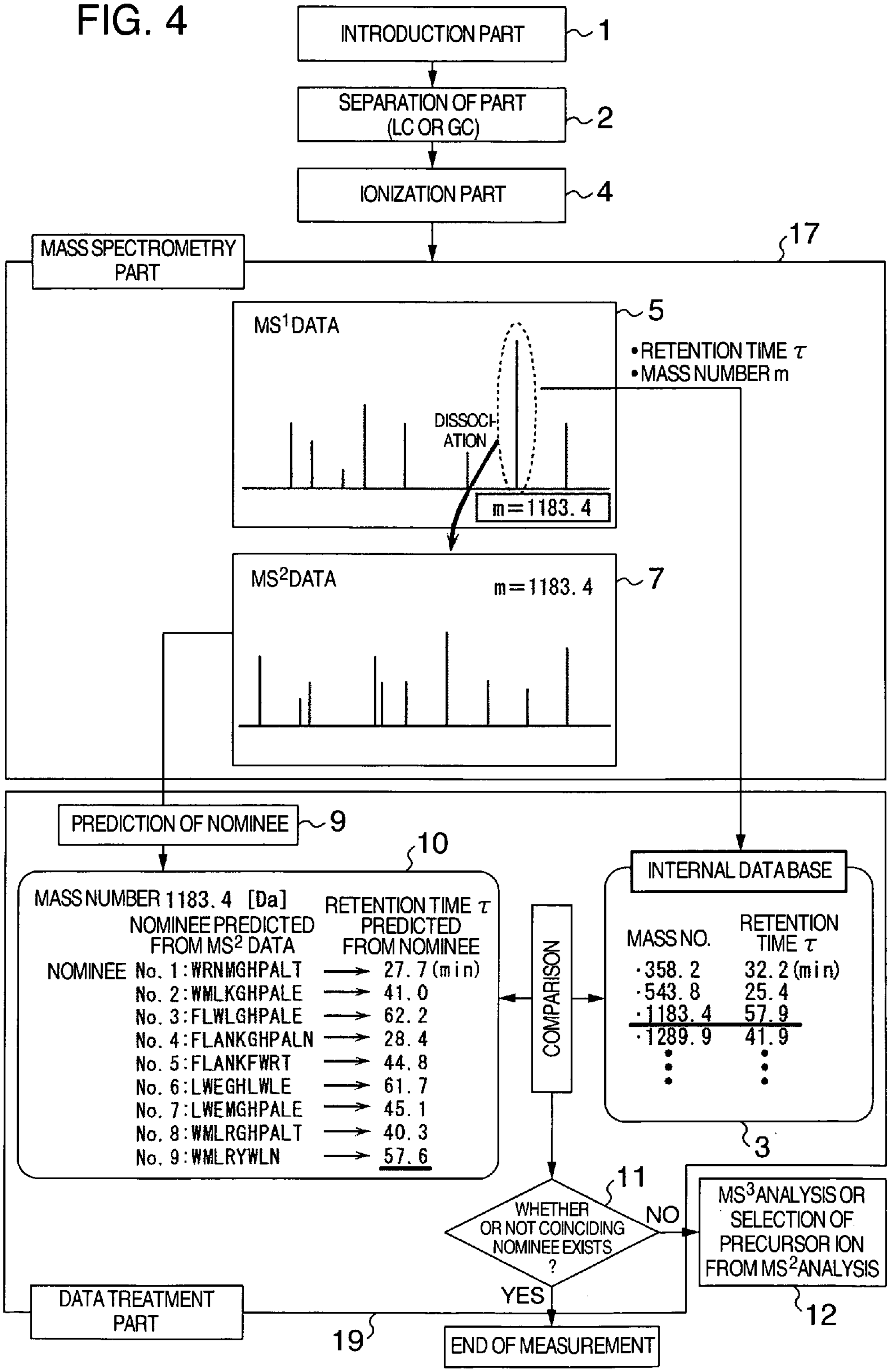
FIG. 4 is an outlined view illustrating the content of retention time judging treatment according to this invention.

Referring to FIG. 4, an example of mass spectrometric analysis based on the flow of this invention will be explained below.

The present example is characterized in that, among the treatments carried out in the data treatment part 19 shown in FIG. 2, a series of treatments consisting of the $MS^2$ mass spectrum analysis 8, the prediction of amino acid sequence nominee 9, the introduction of predicted retention time τ' 10, the comparison of actually measured retention time τ and predicted retention time τ' 11, and the selection of precursor ion in a case that no coinciding nominee exists 12 are carried out within 10 msec (or within 100 msec). In FIG. 4, the constitutional elements having the same numbers as the preceding ones are the same in meaning as the preceding ones, so that only the different constitutional elements will be explained below. Sample 1 which has been introduced from the introduction part is subjected to separation 2 in LC, and ionization 4 in the ionization part. As the method of ionization, ESI (electro spray ionization) method was used herein. The ionized sample is subjected to mass spectrometric analysis ($MS^1$) in the mass spectrometric analysis part (5). Among the ions detected in the ion detecting part 18, a specified ion (m=1183.4 [Da]) is subjected to dissociation reaction (6) in the collision cell, and again subjected to mass spectrometric analysis ($MS^2$) (7). In the present example, nine amino acid sequence nominees were predicted from one $MS^2$ mass spectrometric data. It was difficult to judge the correct sequence only from one $MS^2$ mass spectrometric data in the data treatment part 19.

In the present example, de novo peptide sequence method was used for predicting the amino acid nominee. According to de novo peptide sequence method, the mass of corresponding amino acid is calculated from the peak-to-peak distance in the $MS^2$ mass spectrum data, and the amino acid sequence is predicted therefrom. Since de novo peptide sequence method predicts a sequence only from the mass between peaks, there is a possibility of indicating a number of false positive nominees. Accordingly, it is possible, as in the flow of the present example, to judge which amino acid sequence of them is the correct sequence by comparing the predicted retention time τ' introduced from the amino acid sequence with retention time τ. In the present example, nine amino acid sequences roughly equal in mass number were predicted in the prediction of nominee 9, and predicted retention time τ' was estimated (10) for the predicted amino acid sequence, and the predicted retention time was compared (11) with the value 3 stored in the internal data base.

Since in this example, the allowable error of in the comparison of retention time was taken as ±0.3 minute, the retention time of nominee No. 9 could be regarded as coinciding. In a case that there exists a nominee of which predicted retention time coincides with the retention time, the sequence can be regarded as an amino acid sequence having a high reliability, so that the measurement can be ended or transferred to measurement of the next sample. On the other hand, when no nominee shows a coincidence between the predicted retention time and the retention time, the $MS^2$ mass spectrometric data are regarded as containing no informations enough for predicting the amino acid sequence. Thus, precursor ion for $MS^3$ analysis or $MS^{2'}$ analysis is selected (12) and analyzed, whereby informations useful for the analysis can be supplemented.

In the present example, respective predicted retention time $\tau'$ was estimated from each predicted amino acid sequence, and compared with the measured retention time $\tau$ which has once stored in the internal data base. However, it is also possible to predict the construction of condition-satisfying amino acid sequence from the measured retention time $\tau$ and mass number m. This is carried out either by a method of previously storing a table or the like in which measured retention $\tau$ and mass number m are made to correspond to amino acid sequence data in the internal data base 14, and making a prediction based on comparison with data of known substances, or by a method of making prediction by using parameters which have been empirically decided for respective constitutional elements (in the case of peptides, amino acids and the like).

Figure 5:
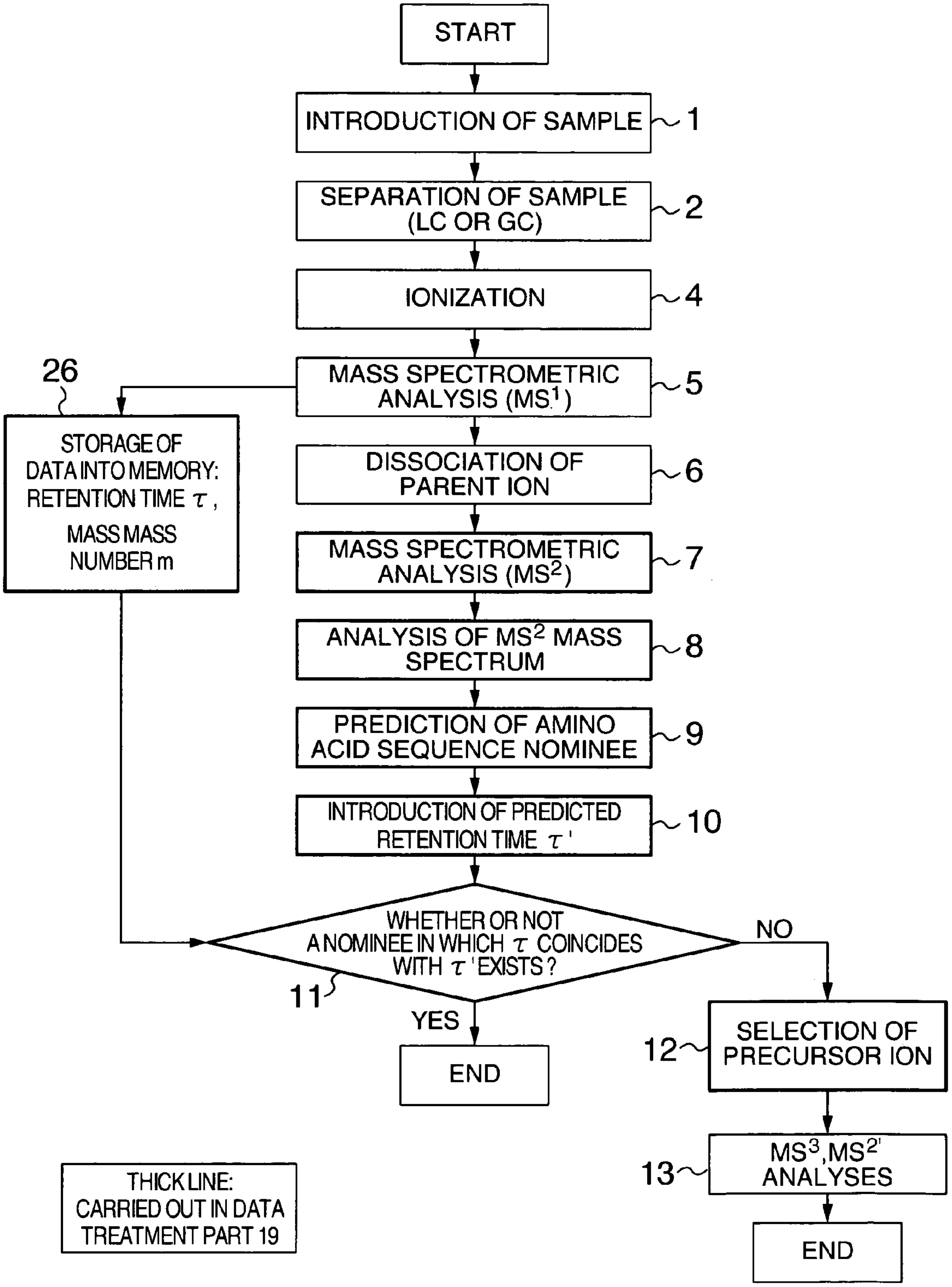
FIG. 5 is an outlined view illustrating the flow of automatic judging treatment of mass spectrometric analytical flow not containing internal data base according to Example 1 of this invention.

In FIG. 1, measured retention time and mass number m were stored in the internal data base. However, it is also allowable to store the data concerning retention time $\tau$ and mass number m directly in the memory as shown in 26 of FIG. 5, instead of passing through the internal data base, and judging the retention time by its use.

Further, it is also possible to carry out the same evaluation as above on sugar chains, chemically modified proteins, chemically modified polypeptides, or chemically modified sugar chains. By proving the $MS^2$ mass spectrum data within the time period of measurement by the use of measurement as above, the accuracy of analysis of the object of measurement can be improved.

Figure 6:
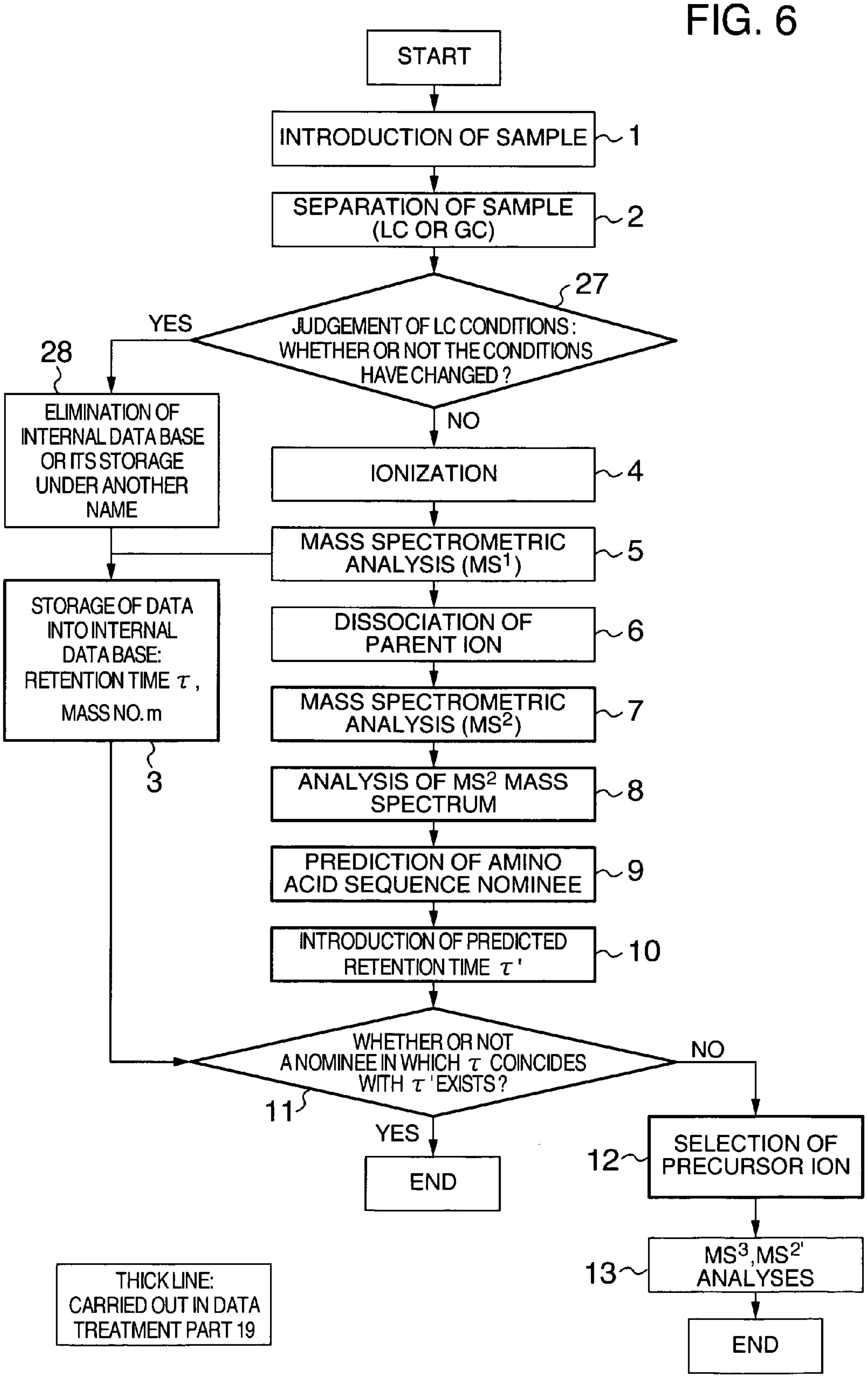
FIG. 6 is an outlined view illustrating of the mass spectrometric analytical system for measuring the mass spectrometric data according to Example 2 of this invention.

Next, the second example of this invention will be explained below. When LC is used in the mass spectrometry for separation of sample, the retention time greatly changes depending on various conditions such as the kinds of column and buffer solution, the flow rate, the dust in the solution, etc. Accordingly, in the case of providing internal data base 14 in the mass spectrometric analyzer, storing the informations concerning retention time $\tau$ and mass number m of LC there, and carrying out judgement of the predicted retention time by the use of the informations, there is a possibility that conditions of measurement are different from the preceding case. When the conditions of LC are different from those at the time of storing them in the internal data base, retention time of the sample is also different. Therefore, it is difficult to carry out a judgement of high accuracy. Accordingly, when the user has altered the conditions of LC or at least a certain period of time (for example, 24 hours, or a value decided by the user) has passed, namely when the conditions of measurement are considered to have changed, the preceding internal data base cannot be used for judgement. Thus, in this example, as shown in FIG. 6, after the sample separation 2, judgement of LC conditions 28 is carried out in the data treatment part 19. If the LC conditions are the same, progression to the flow of Example 1 is permitted. When the user has altered the LC conditions or when more than the predetermined period of time (for example, 24 hours, or a value decided by the user) has passes, namely when the system automatically judges that the LC conditions have changed, the data stored into the internal data base are eliminated or stored under another name (28), and a novel internal data base is prepared. When the user can judge before the measurement that the LC conditions are different, it is also possible that the user himself eliminates the internal data base or stores the data base under another name. On the other hand, when the user has judges that the conditions are just the same as in the preceding measurement, it is also possible to read the stored data into the data base, and to use the data as an internal data base. By the above-mentioned function of storing or automatically eliminating the internal data base, it is possible to carry out an analysis of high precision always.

Next, the third example of this invention will be explained. Regarding the dissociation of peptides in mass spectrometry, the mobile proton model has been proposed (Referential Literature: V. H. Wysocki, G. Tsaprailis, L. L. Smith and L. A. Breci, J. Mass Spectrom. 35, 1399 (2000).

Hereunder, the mobile proton model will be explained by referring to FIGS. 7 and 8.

Figure 7:
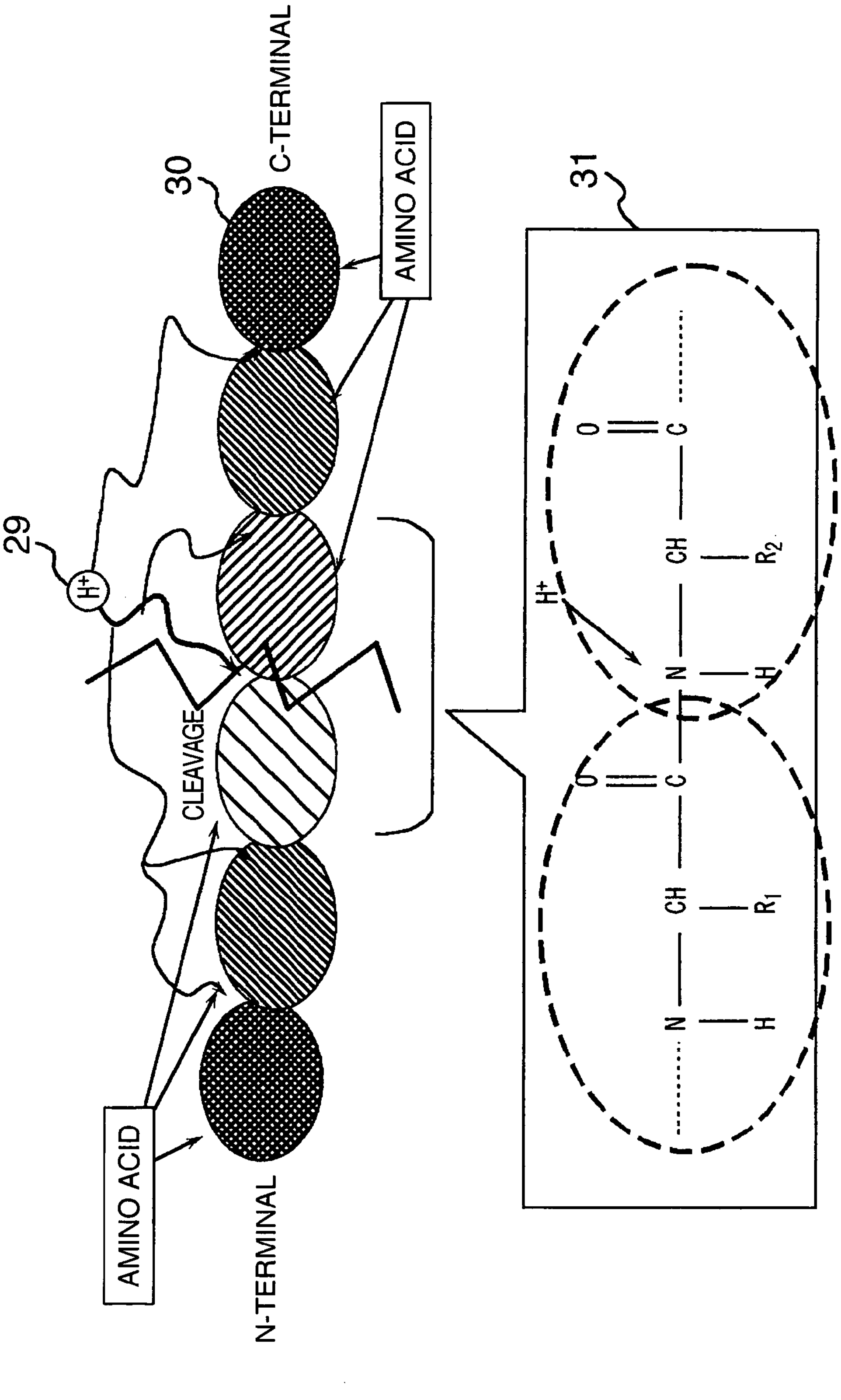
FIG. 7 is conceptional view (1) of the dissociation model in the mobile proton model.
Figure 8:
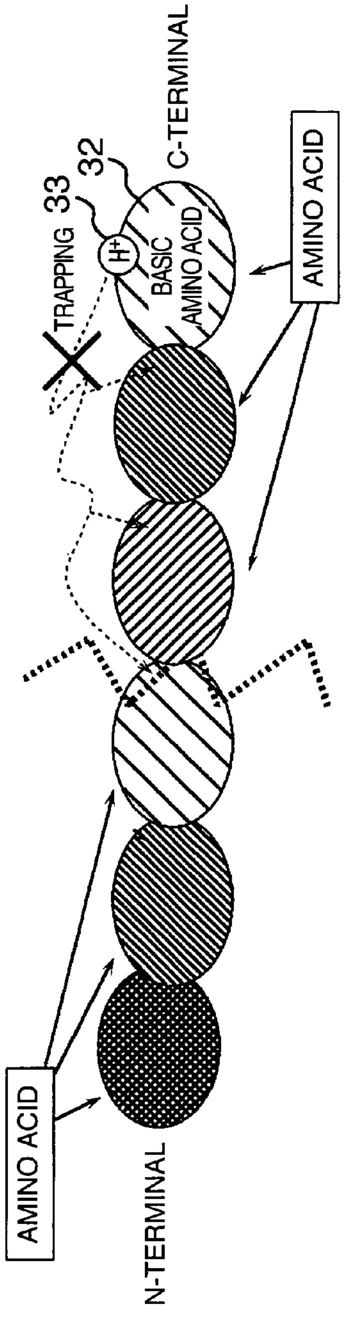
FIG. 8 is conceptional view (2) of the dissociation model in the mobile proton model.
Figure 9:
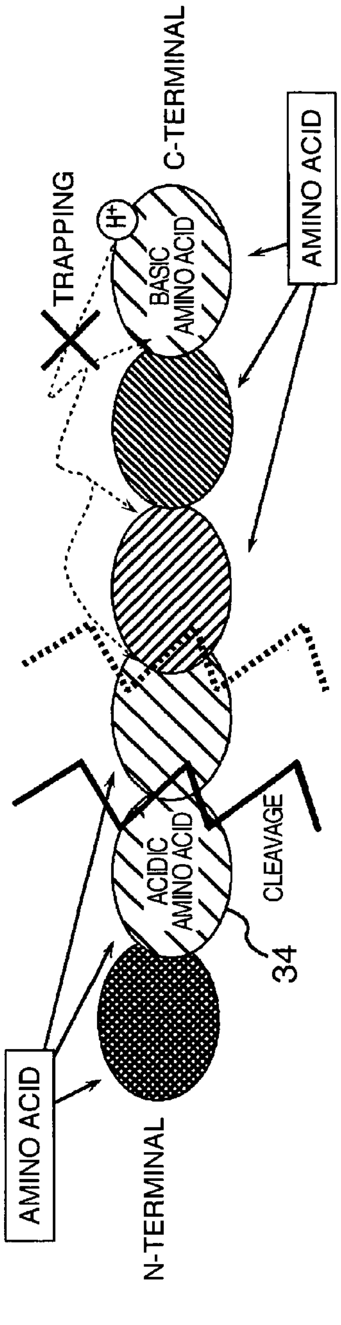
FIG. 9 is conceptional view (3) of the dissociation model in the mobile proton model.
Figure 10:
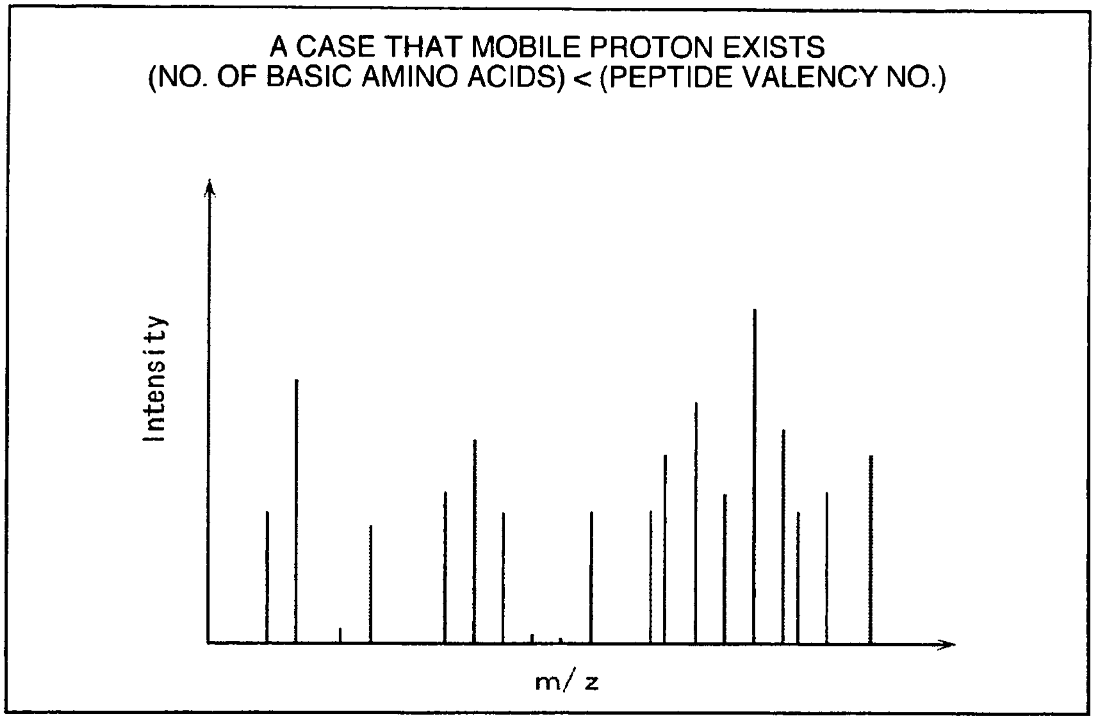
FIG. 10 is a conceptional view (1) of mass spectrometry in a case of subjecting a peptide in which mobile proton exists and a peptide in which no mobile proton exists to $MS^2$ analysis.
Figure 11:
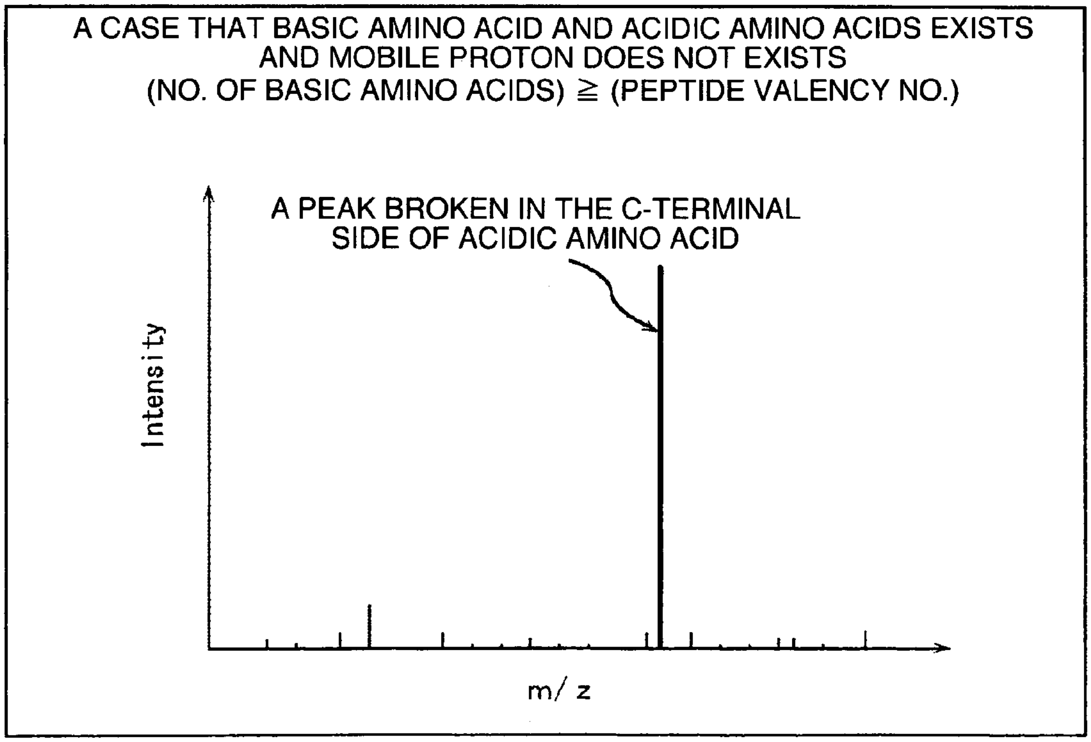
FIG. 11 is a conceptional view (2) of mass spectrometry in a case of subjecting a peptide in which mobile proton exists and a peptide in which no mobile proton exists to $MS^2$ analysis.

As shown in FIG. 7, the mobile proton model is a model that the peptide linkage between amino acids 30 are cleaved by freely movable proton 29 ($H^+$: mobile proton). There has been proposed a model 31 that mobile proton 29 is added to the nitrogen atom of CONH linkage of main chain to cause cleavage of the main chain (Referential Literature: V. H. Wysocki, G. Tsaprailis, L. L. Smith and L. A. Breci, J. Mass Spectrom. 35, 1399 (2000)). When mobile proton 29 exists as shown in FIG. 7, there are obtained cleaved fragments between a variety of amino acids as shown in FIG. 10. On the other hand, as shown in FIG. 8, mobile proton has an intense interaction with basic amino acid 32 such as arginine or the like and trapped 33 by basic amino acid 32. The trapped proton 33 cannot move around out of the trapped site (Referential Literature: V. H. Wysocki, G. Tsaprailis, L. L. Smith and L. A. Breci, J. Mass Spectrom. 35, 1399 (2000)). Accordingly, when a peptide contains basic amino acids 32 (particularly arginine) in a number exceeding the valency number of the peptide, the mobile protons 29 are wholly trapped by the basic amino acid 32, and do not exist. In this case, there is a tendency that the cleavage between amino acids cannot take place readily, so that the cross section of cleavage is small (the ion strength of the ions obtained by dissociation is small). Further, it has been reported that, in a case that no mobile proton exists and acidic amino acids 34 such as aspartic acid, glutamic acid, etc. exist as shown in FIG. 9, cleavage takes place selectively in the C-terminal side of acidic amino acid 34 (Referential Literature: V. H. Wysocki, G. Tsaprailis, L. L. Smith and L. A. Breci, J. Mass Spectrom. 35, 1399 (2000)). In such a case, dissociation of a part takes place selectively, so that there are obtained such mass spectrum data as shown in FIG. 11. It is considered that, in such a case, the fragment peaks formed by dissociation between other amino acids show a very low intensity, so that it is difficult to analyze the object of measurement in a high accuracy. Further, even if acidic amino acid 34 is not necessarily contained, a decrease in the number of dissociated peaks or peak intensity is expected, so far as mobile proton 29 does hot exist.

Figure 12:
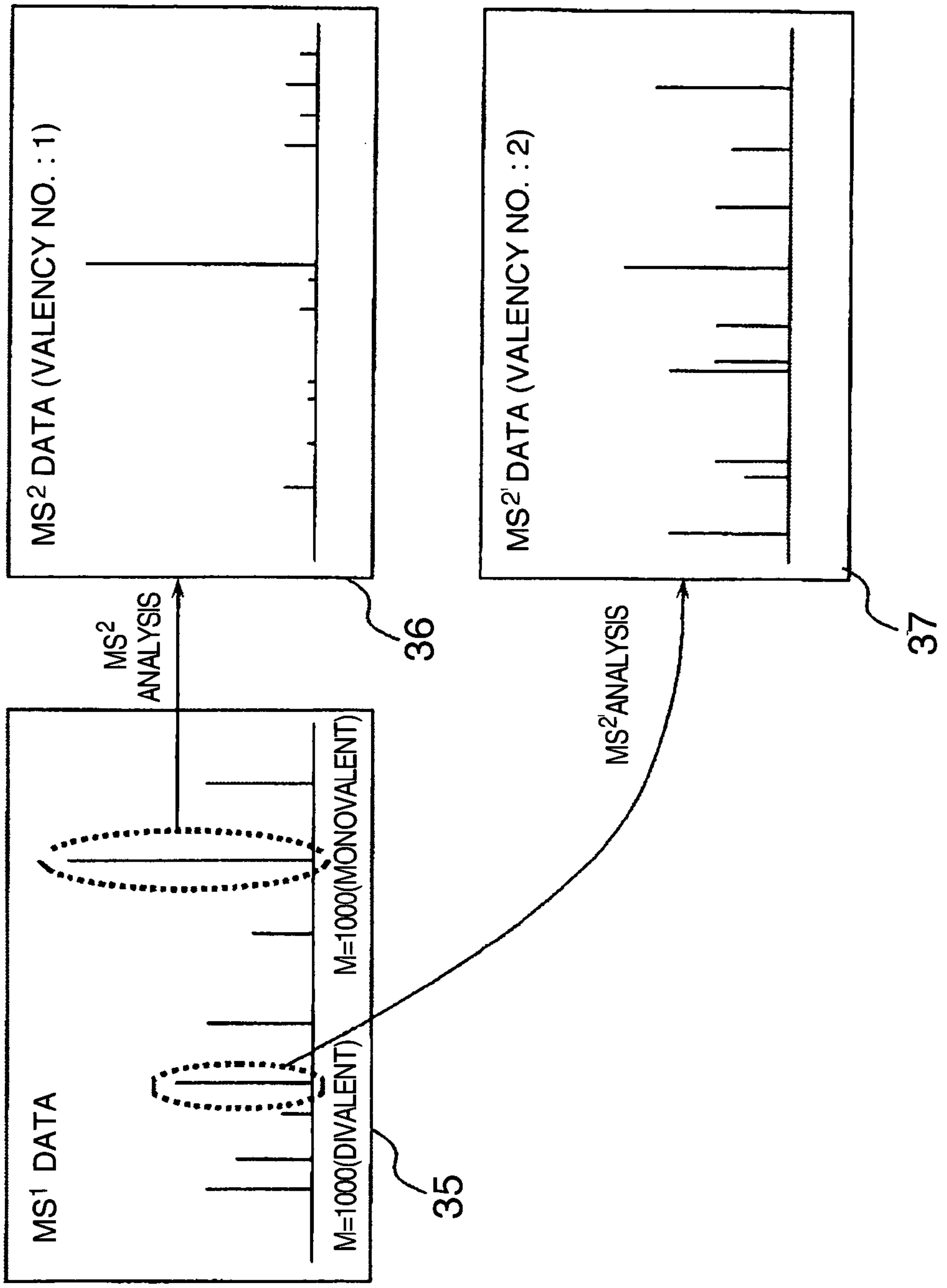
FIG. 12 is a conceptional view illustrating the selection of mobile proton ion in Example 3 of this invention.
Figure 13:
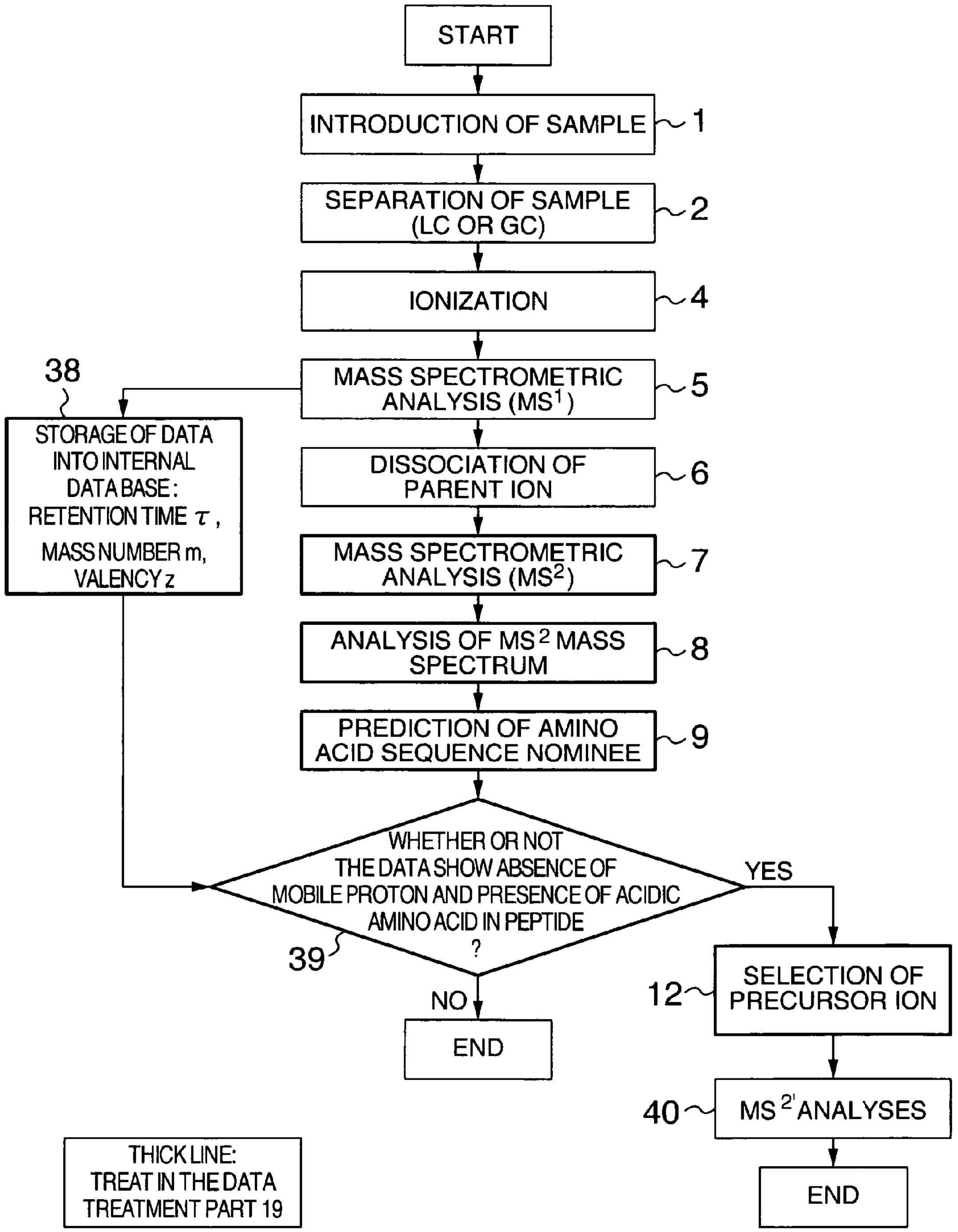
FIG. 13 is an outlined view illustrating the mass spectrometric system for measuring the mass spectral data according to Example 3 of this invention.

Hereunder, this example will be explained by referring to FIGS. 12 and 13. Herein will be mentioned an example in which $MS^2$ analysis is carried out on a peptide containing one alginic acid which is a basic amino acid and one aspartic acid which is an acidic amino acid. In FIG. 12, when a peptide having a mass number of 1,000 has been detected at valency numbers of 1 and 2 in the mass spectrum data 35 ($MS^1$), $MS^2$ analysis is carried out on each ion. Regarding the ion having a valency number of 1, (number of basic amino acid: 1)≧(valency number of peptide: 1) holds, so that no mobile electron exists. On the other hand, regarding the ion having a valency number of 2, (number of basic amino acids: 1)<(valency number of peptide: 1) holds, so that a mobile proton exists. When a peptide having a valency number of 1 is selected as target (parent ion) of $MS^2$ analysis and an $MS^2$ analysis is carried out, a selective dissociation takes place between the C-terminals of acidic amino acid as shown in FIG. 9 because no mobile proton exists and dissociated fragments between other amino acids are not obtained sufficiently (36). On the other hand, when a peptide having a valency number of 2 is selected as target (parent ion) of $MS^2$ analysis and an $MS^2$ analysis is carried out, a mobile proton exists, so that there are obtained dissociated fragments between a variety of amino acids (37). In this example, as shown in the mass spectrum data of FIG. 13 , when it is judged at 39 that no mobile proton exists based on the amino acid sequences and the peptide valency numbers predicted from the predicted amino acid sequence nominee 9 carried out at data treatment part 19 and the data suggest the existence of acidic amino acid in the peptide, the data treatment part 19 selects, as the precursor ion (this selection is expressed by 12), an ion equal in mass number m to the ion selected in the preceding measurement and larger in valency number z to the ion selected in the preceding measurement, and $MS^{2'}$ analysis 40 is carried out. Since in this example the valency number of ion is also taken into consideration in the selection of precursor ion 12, informations concerning valency number z are also stored together with retention time τ and mass number m at the time of storing the data of mass analysis into the internal data base 14 (38). By the procedure mentioned above, the possibility of increasing the number of dissociated fragment increases and an improvement in the identification of protein can be expected. Provided that the measurement of 39 may be carried out only based on the existence of mobile proton regardless of the existence of acidic amino acid.

Figure 14:
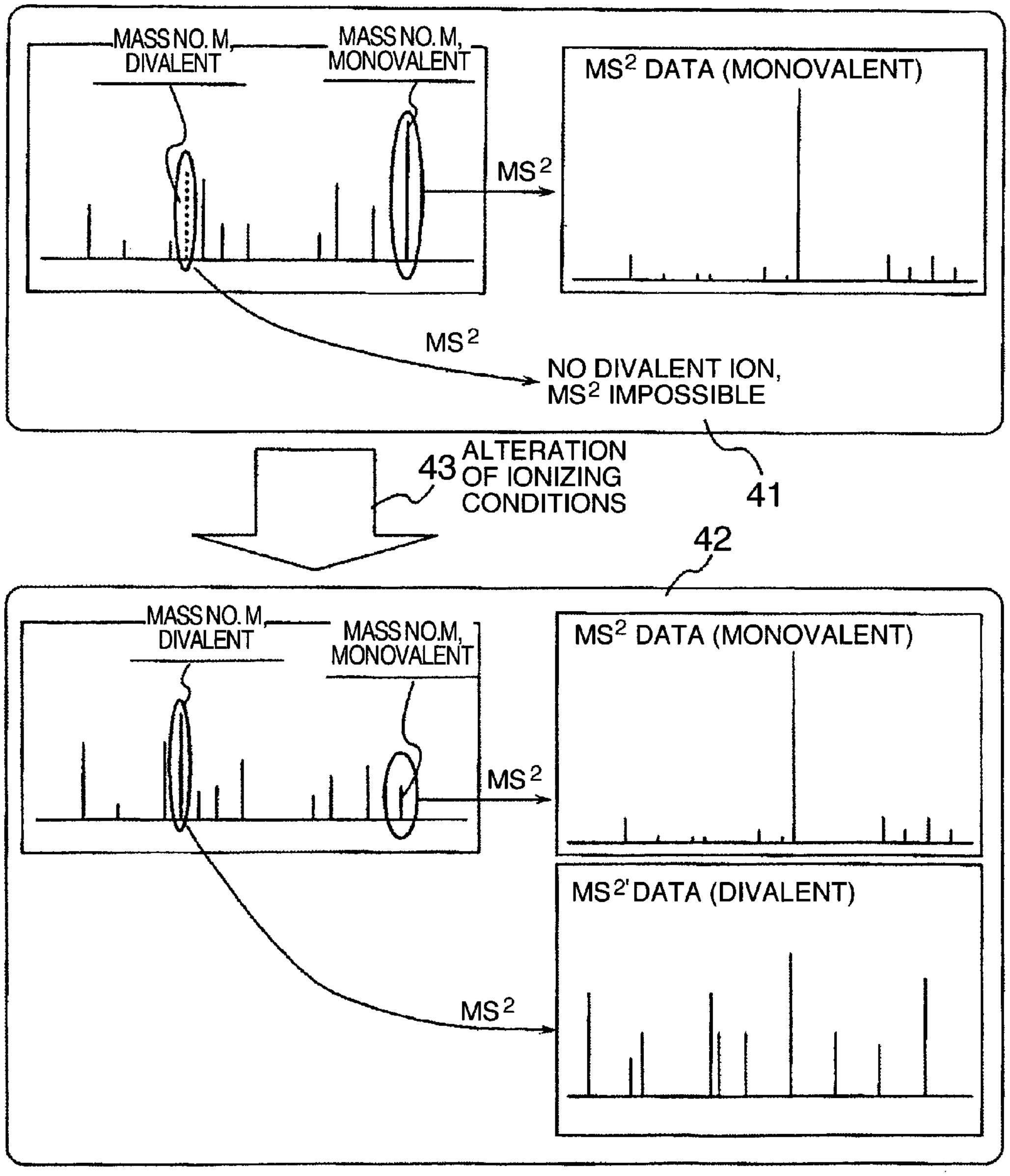
FIG. 14 is a conceptional view illustrating the change in the conditions of ionization in Example 4 of this invention.
Figure 15:
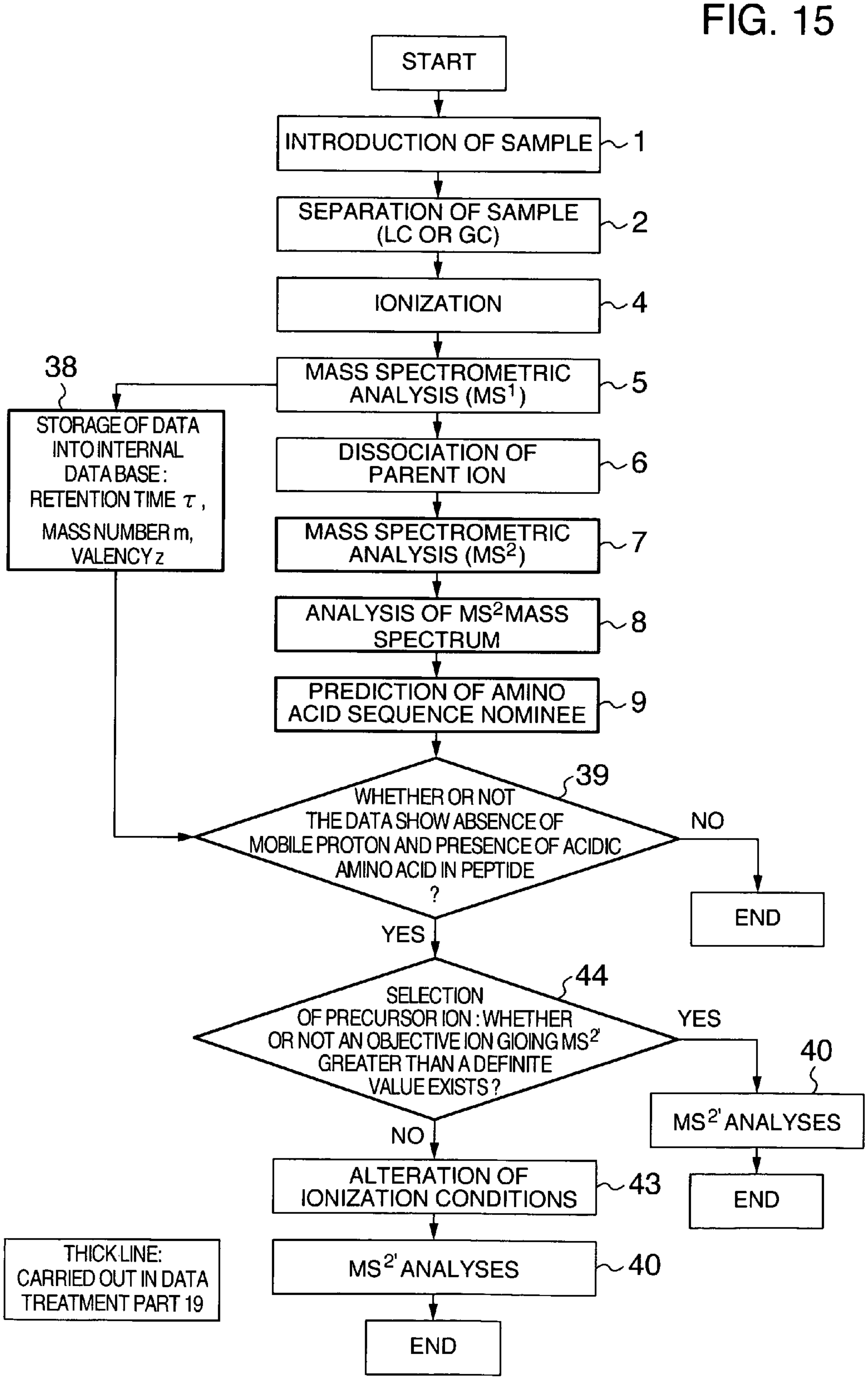
FIG. 15 is an outlined view illustrating the mass spectrometric system for measuring the mass spectrometric data according to Example 4 of this invention.

Next, the fourth example of this invention will be explained by referring to FIGS. 14 and 15. It has been described in Example 3 that, in the mass analysis of peptides, selection of an ion having a high possibility of existence of mobile electron and having a high valency number as the precursor ion for $MS^n$ analysis (n≧2) makes easy the detection of dissociated fragments. However, for judging noises and peaks, it is necessary to carry out the mass analysis on peaks having at least a certain ion strength (for example, number of detected ion number 100/sec, etc.). Therefore, as shown in FIG. 14, if $MS^2$ analysis is carried out by using a monovalent parent ion having a mass number of M as an objective substance, ions having higher valency number show a very low intensity. If such an ion does not exist, it is impossible to select an ion having a higher valency (41). In such a case, as shown in FIG. 15, a judgement 39 is made in the data treatment part 19 on whether or not mobile proton does not exist and acidic amino acid is contained in the peptide, based on the amino acid sequence of peptide predicted from the predicted amino acid sequence nominees 9 carried out in the data treatment part 19 and valency numbers of peptides. When it has been judged that the data suggests absence of mobile proton and presence of acidic amino acid in the peptide, a judgement 44 is carried out in the data treatment part 19 whether or not an ion (precursor ion) equal in mass number to the ion selected in the preceding measurement and a valency number z greater than that of the ion selected in the preceding measurement exists. Since in the present example the valency number of ion is also taken into consideration in the selection 44 of precursor ion, informations concerning valency number z are stored together with retention time τ and mass number m from the mass spectrometric system 5 into the internal data base 14 (38). When a precursor ion showing an intensity higher than a definite value (for example, the number of detected ions 100/sec) exists, $MS^{2'}$ analysis 40 is carried out. When it has been judged that ions having a greater valency (for example, divalent) do not exist or the intensity is very weak, $MS^{2'}$ analysis is impossible to carry out, so that alteration 43 of the conditions of ionization part 16 is carried out. By altering the ionizing conditions 43, a change in the distribution of ion valency numbers can be expected, a possibility of applicability of $MS^n$ (n≧2) to the probably existing divalent ions increases, and thereby the possibility of increasing the dissociated fragments increases, and an improvement in the accuracy of identification of protein can be expected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mass spectrometric system comprising a sample introduction part for introducing a sample, a sample separation part for separating the sample, a tandem mass spectrometric analysis part for measuring information concerning the retention time τ of said sample in the sample separation part, an internal data base for storing information concerning a substance and retention time τ of said substance in said sample separation part, and an evaluation part for carrying out evaluation of the structure of the sample by the use of the retention time of said sample in the sample separation part and the retention time τ which has been stored into the internal data base in the sample separation part within the time period of actual measurement.

2. A method for tandem mass spectrometric analysis which comprises a procedure for introducing a sample, a procedure for separating the sample, a procedure for ionizing the sample, a procedure for subjecting the sample to tandem mass spectrometric analysis, a procedure for storing the mass number of the substance constituting the sample and information concerning retention time τ of said substance obtained in the procedure for separating the sample into the internal data base, a procedure for treating the mass spectrometric data, and a procedure for evaluating the mass spectrometric analytical data within the actual time period of measurement by the use of the retention time τ stored into the internal data base in the sample separation part.

3. A mass spectrometric system according to claim 1, wherein said sample separation part is a liquid chromatography.

4. A mass spectrometric system according to claim 1, wherein said sample separation part is a gas chromatography.

5. A mass spectrometric system according to claim 1, wherein constitution or structure of a substance is predicted from the retention time τ measured in the sample separation part and mass number.

6. A mass spectrometric system according to claim 5, wherein, as a means for predicting the construction or structure of a substance, the construction or structure is predicted based on a table or a data base in which retention time $\tau$, mass number m and the corresponding data of construction or structure of the substance are stored.

7. A mass spectrometric system according to claim 5, wherein, as the means for predicting the construction or structure of a substance, the construction or structure of a substance is predicted based on a calculation using an empirical formula expressing the correspondence of retention time $\tau$ and mass number m to the construction or structure of the substance.

8. A mass spectrometric system according to claim 1, wherein said evaluation part predicts the construction or structure of the object of measurement by comparing the prospected retention time $\tau'$ predicted from the nominee of construction or structure of the object of measurement with the retention time $\tau$ measured in the sample separation part.

9. A mass spectrometric system according to claim 1, wherein said evaluation part rejects a false positive nominee by comparing the predicted retention time $\tau'$ predicted from the nominees of construction and structure of the object of measurement with the retention time $\tau$ measured in the sample separation part.

10. A mass spectrometric system according to claim 1, wherein when retention time $\tau$ is stored in the sample separation part and the conditions of the sample separation part are regarded as changed in the next measurement of mass spectrometry, the data concerning the stored retention time $\tau$ are eliminated.

11. A mass spectrometric system according to claim 1, wherein when retention time $\tau$ is stored in the sample separation part and the conditions of the sample separation part are regarded by the user as changed in the next measurement of mass spectrometry, the data base is stored under another name.

12. A mass spectrometric system according to claim 1, wherein, when the retention time $\tau$ is stored in the sample separation part and the conditions of the sample separation part are considered to have changed in the next mass spectrometric analytical data measurement, the data base is stored under another name.

13. A mass spectrometric system according to claim 10, wherein the cases of regarding that the conditions of sample separation part have changed include a case of altering the conditions of the sample separation part and a case that a predetermined period of time has passed until the next measurement of mass spectrometric data.

14. A mass spectrometric system according to claim 1, wherein when the system is equipped with multi-stage mass spectrometric function, namely a function of subjecting an objective sample of analysis to mass spectrometry, selecting and dissociating a specified ion having a specified m/z value and subjecting the dissociated ion to mass spectrometry, the term "mass spectrometric data" means the mass spectrometric data of the n-th stage wherein n is an integer not smaller than 1.

15. A mass spectrometric system according to claim 14, which comprises selecting out an ion peak having an m/z value different from the m/z value which has been selected in obtaining the $MS^2$ mass spectrometric data from the information concerning the amino acid construction such as amino acid sequence predicted from the $MS^2$ mass spectrometric data and judging whether the n-th stage of mass spectrometric analysis is again carried out or not, when the sample is a polypeptide in the n-th stage (n is an integer not smaller than 2) of mass spectrometric data.

16. A mass spectrometric system according to claim 14, wherein the case of again carrying out the n-th stage of mass spectrometric analysis based on the information concerning amino acid construction is a case that (predicted number of basic amino acids contained in the polypeptide)≧(valency number of polypeptide) holds.

17. A mass spectrometric system according to claim 14, wherein a case of again carrying out the n-th stage of mass spectrometric analysis based on the information concerning the amino acid construction is a case that (predicted number of basic amino acids contained in a polypeptide)≧(valency number of polypeptide) holds and the mass spectrometric data are considered the data of a case that acidic amino acid is contained in the predicted amino acid sequence of peptide.

18. A mass spectrometric system according to claim 14, wherein the ion peak having an m/z value different from the m/z value selected at the time of obtaining the $MS^2$ mass spectrometric data is an ion peak having the same mass number m and a different valency number z.

19. A mass spectrometric system according to claim 18, wherein said ion peak different in valency number z is an ion peak of which z is greater than in the ion selected in the preceding time.

20. A mass spectrometric system according to claim 1, wherein said actual time period of measurement is not longer than 100 msec.

21. A mass spectrometric system according to claim 2, wherein said actual time period of measurement is within 100 msec.

* * * * *